US008376379B2

(12) United States Patent
Park et al.

(10) Patent No.: US 8,376,379 B2
(45) Date of Patent: Feb. 19, 2013

(54) STEERING APPARATUS FOR VEHICLE

(75) Inventors: Kisung Park, Hwaseong-si (KR); Seil Kim, Suwon-si (KR); Youngho Oh, Hwaseong-si (KR); Soobo Park, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 142 days.

(21) Appl. No.: 12/955,640

(22) Filed: Nov. 29, 2010

(65) Prior Publication Data

US 2012/0080861 A1 Apr. 5, 2012

(30) Foreign Application Priority Data

Sep. 30, 2010 (KR) ........................ 10-2010-0095161

(51) Int. Cl.
*B62D 3/12* (2006.01)

(52) U.S. Cl. .................... 280/93.514; 74/422; 74/498

(58) Field of Classification Search .................. 74/422, 74/498, 388 PS; 180/444; 280/93.513, 93.514
See application file for complete search history.

(56) References Cited

U.S. PATENT DOCUMENTS

| | | | | |
|---|---|---|---|---|
| 3,064,491 A * | 11/1962 | Bishop | ............................ | 74/437 |
| 4,133,221 A * | 1/1979 | Clary | ............................. | 74/498 |
| 4,444,070 A * | 4/1984 | Yanai | ............................. | 74/422 |
| 4,475,413 A * | 10/1984 | Higuchi | ........................ | 74/422 |
| 4,570,734 A * | 2/1986 | Taig | ............................... | 180/444 |
| 4,619,155 A * | 10/1986 | Futaba | ............................ | 74/498 |
| 4,641,406 A * | 2/1987 | Rogers | ......................... | 29/893.3 |
| 4,646,554 A * | 3/1987 | Wallis et al. | .................... | 72/406 |
| 4,766,970 A * | 8/1988 | Shimizu | ......................... | 180/444 |
| 4,890,683 A * | 1/1990 | Matsuda et al. | ............... | 180/444 |
| 5,687,811 A * | 11/1997 | Shimizu | ........................ | 180/447 |
| 5,860,323 A * | 1/1999 | Mizutani et al. | ................ | 74/422 |
| 6,470,993 B1 * | 10/2002 | Matsuda et al. | .............. | 180/444 |
| 2011/0204588 A1* | 8/2011 | Yang et al. | ............... | 280/93.514 |

FOREIGN PATENT DOCUMENTS

| | | | |
|---|---|---|---|
| DE | 3612048 A1 * | 10/1987 | |
| GB | 2135013 A * | 8/1984 | |
| JP | 55051665 A * | 4/1980 | |
| JP | 56076757 A * | 6/1981 | |
| JP | 57073269 A * | 5/1982 | |
| JP | 9-48364 A | 2/1997 | |
| JP | 09-086420 A | 3/1997 | |
| JP | 2003-300469 A | 10/2003 | |
| JP | 2005-112013 A | 4/2005 | |
| KR | 1999-015815 A | 3/1999 | |
| KR | 2002-0084957 A | 11/2002 | |
| KR | 10-0745915 B1 | 8/2007 | |
| KR | 814760 B1 * | 3/2008 | |

* cited by examiner

*Primary Examiner* — Paul N Dickson
*Assistant Examiner* — Laura Freedman
(74) *Attorney, Agent, or Firm* — Morgan, Lewis & Bockius LLP

(57) ABSTRACT

A steering apparatus for a vehicle may include a steering pinion rotated by operation of a steering wheel, and a steering rack bar having a rack engaged with the steering pinion to move straight in a longitudinal direction thereof, wherein a tooth gap in a gear of the rack changes such that a steering gear ratio corresponding to a linear displacement of the steering rack bar according to rotation of the steering pinion increases and then decreases in both sections from the center of the rack to both ends thereof.

8 Claims, 3 Drawing Sheets

FIG.3
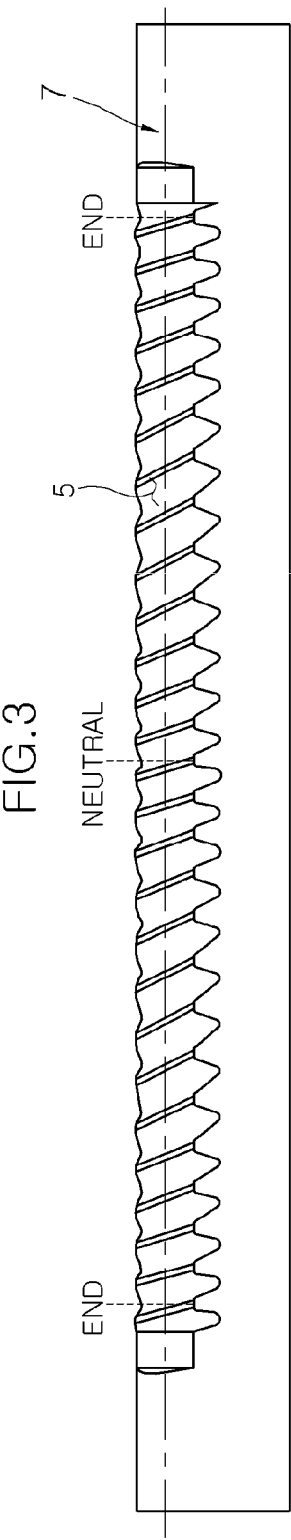
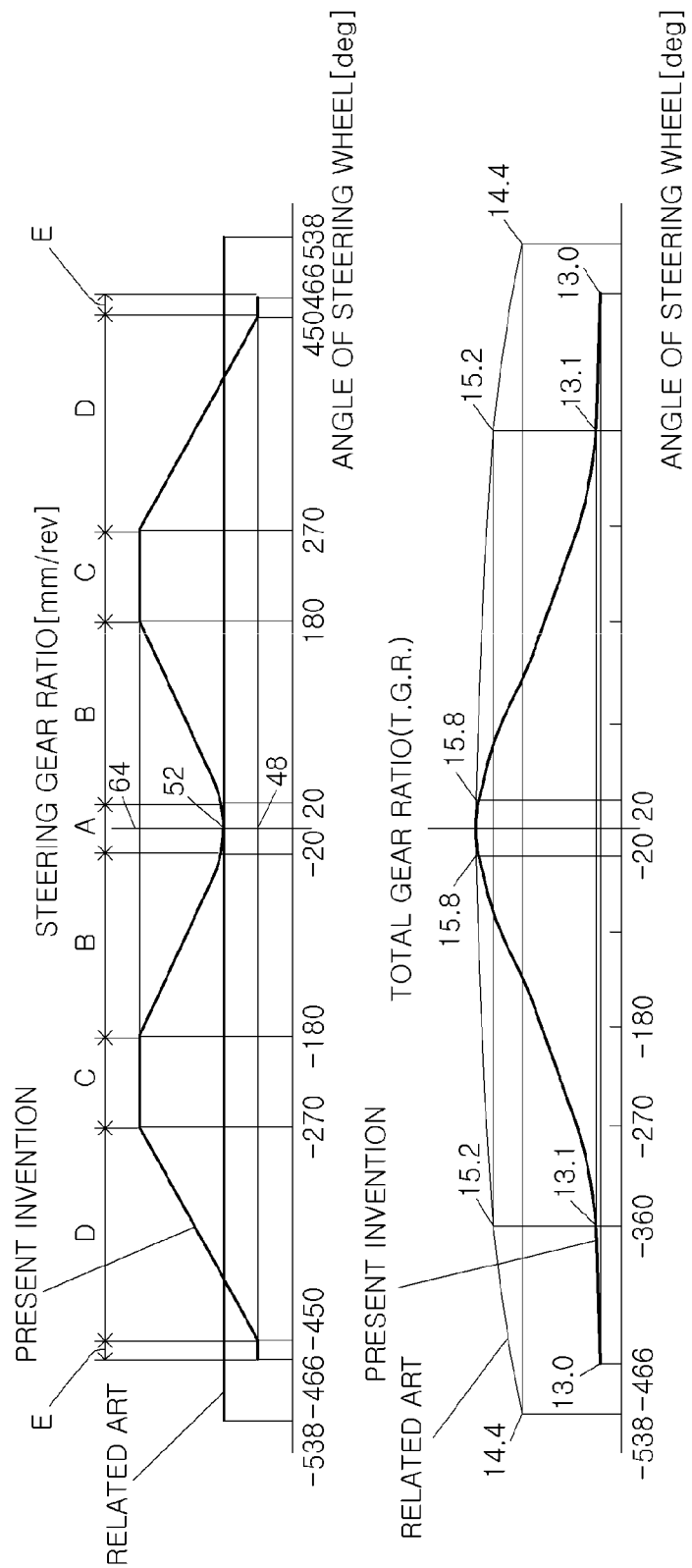

STEERING APPARATUS FOR VEHICLE

CROSS-REFERENCE TO RELATED APPLICATIONS

The present application claims priority to Korean Patent Application Number 10-2010-0095161 filed Sep. 30, 2010, the entire contents of which application is incorporated herein for all purposes by this reference.

BACKGROUND OF THE INVENTION

1. Field of the Invention

The present invention relates to a steering apparatus for a vehicle, and more particularly, to a structure of a rack & pinion type of steering apparatus which improves steering characteristics.

2. Description of Related Art

A steering system of a vehicle should be able to appropriately steer the vehicle in accordance with the driver's intention, ensure stability in high-speed traveling, and be operated by simple operation for steering in traveling at low speed or parking, without excessive operation force.

Further, the steering wheel is the part that is the most directly and frequently operated by the driver and transmits the operational state of the vehicle to the driver in driving the vehicle; therefore, the operation state and direct feel transmitted in steering are very important in the steering apparatus.

Meanwhile, MDPS (Motor Driven Power Steering) that assists the steering force applied by the driver by using torque from a motor has been developed in recent years, replacing the hydraulic power steering apparatuses of the related art, in order to assist the steering force of the driver, and the MDPS should also satisfy the requirements for the common steering apparatuses, as described above.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a steering apparatus for a vehicle that can ensure high-speed stability in high-speed traveling of a vehicle, ensure direct feel, response, and response linearity in low-speed and middle-speed traveling, and reduce frequency of steering and steering force in parking.

In an aspect of the present invention, the steering apparatus for a vehicle, may include a steering pinion rotated by operation of a steering wheel, and a steering rack bar having a rack engaged with the steering pinion to move straight in a longitudinal direction thereof, wherein a tooth gap in a gear of the rack changes such that a steering gear ratio corresponding to a linear displacement of the steering rack bar according to rotation of the steering pinion increases and then decreases in both sections from the center of the rack to both ends thereof.

The steering gear ratio may include a linear increase section where the steering gear ratio linearly increases after a neutral section, an upper limit-maintained section where the increased steering gear ratio may be maintained after the linear increase section, and a linear decrease section where the steering gear ratio linearly decreases after the upper limit-maintained section.

In the linear increase section, a rotation angle of the steering wheel from the center may be approximately ±10° to approximately ±25°.

The linear decrease section extends to a steering gear ratio below the steering gear ratio of the neutral section, and the steering gear ratio further may include a lower limit-maintained section where a smallest steering gear ratio may be maintained after the linear decrease section.

The linear increase section may be a section where a rotation angle of the steering wheel may be approximately 170° to approximately 190° after a neutral section, and the upper limit-maintained section may be a section where a rotation angle of the steering wheel may be approximately 260° to approximately 280° after the linear increase section.

The linear decrease section may be reduced in the same inclination as the linear increase section.

The steering gear ratio may be approximately 48 to approximately 52 mm/rev in the neutral section, the increase of the steering gear ratio in the linear increase section may be approximately 10 to approximately 13 mm/rev, and the steering gear ratio in the upper limit-maintained section may be approximately 62 to approximately 66 mm/rev.

An electric motor providing sub-steering force in accordance with operation of the steering wheel may be connected to the steering pinion.

According to the exemplary embodiment of the present invention, it is possible to ensure high-speed stability in high-speed traveling of a vehicle, ensure direct feel, response, and response linearity in low-speed and middle-speed traveling, and reduce frequency of steering and steering force in parking.

Further, it is possible to implement MDPS having improved direct feel and response while reducing capacity of an electric motor for the MDPS as much as possible.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 3 shows graphs of changes in steering gear ratio of the rack of FIG. 2 to rotation angle of a steering wheel and total gear ratios showing angles of the steering wheel required to turn the steered wheel at 1° to turning angle of the steering wheel It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

Figure 1:
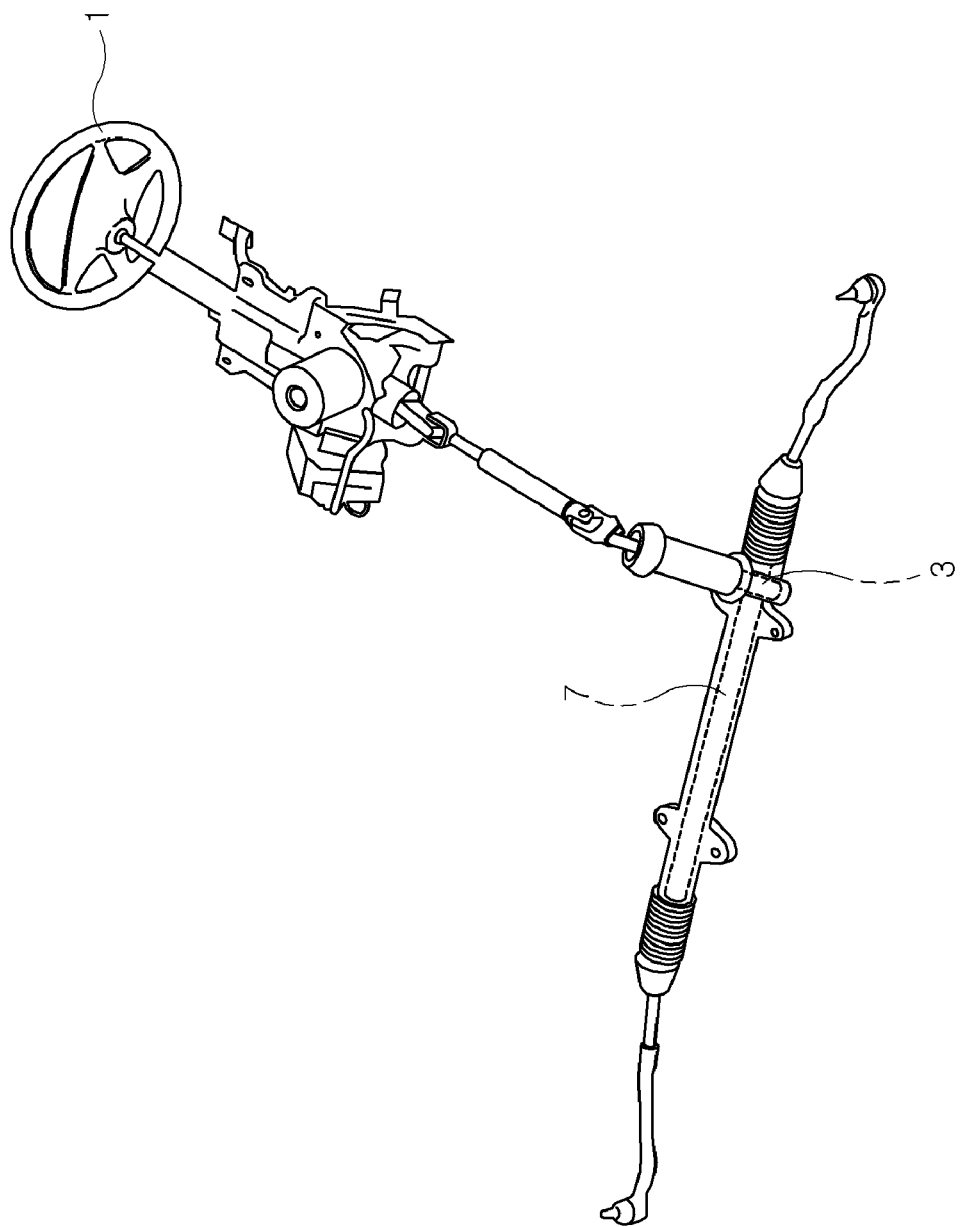
FIG. 1 is a view showing a steering apparatus for a vehicle according to an exemplary embodiment of the present invention.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
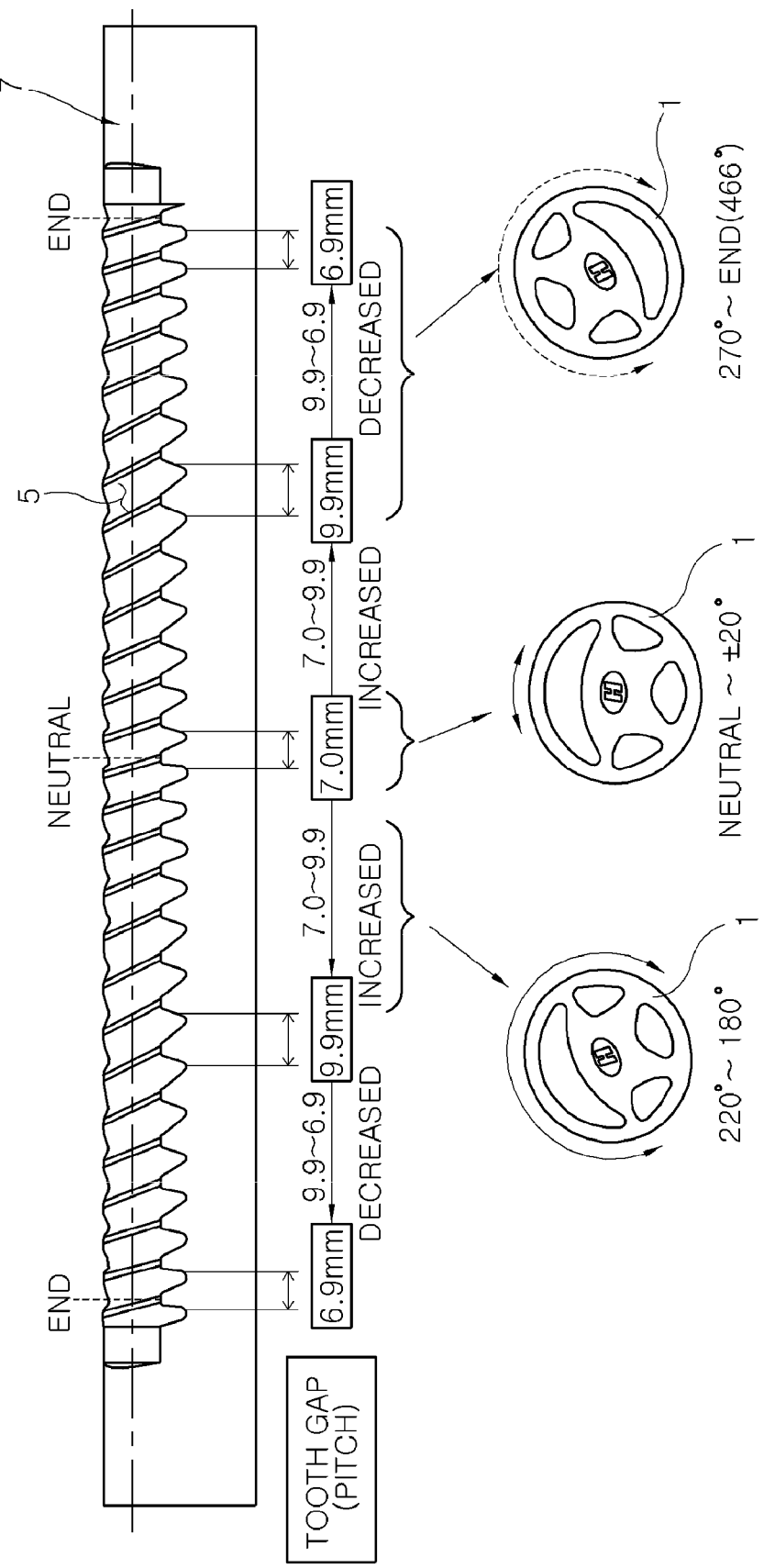
FIG. 2 is a view showing in detail the main parts of a steering rack bar of FIG. 1 and showing an example of changes in tooth gap of the gear of the rack.

Referring to FIGS. 1 to 3, a steering apparatus for a vehicle according to the exemplary embodiment of the present invention includes a steering pinion 3 rotated by the operation of a steering wheel 1 and a steering rack bar 7 having a rack 5 engaged with steering pinion 3 and moving linearly left and right, where the tooth gap of the gear of rack 5 changes such that a steering gear ratio corresponding to the linear displacement of steering rack bar 7 to rotation of steering pinion 3 increases and decreases in both sections from the center of rack 5 to both ends.

That is, the steering gear ratio was fixed because the rack of the rack bar has a gear with a predetermined tooth gap throughout the rack in the common rack & pinion type of steering systems. However, the present invention provides a steering apparatus having variable steering gear ratio in order to implement different steering gear ratios in accordance with the position of a steering pinion 3 engaged with rack 5 of steering rack bar 7 to rotate with steering wheel 1, that is, in accordance with the rotation angle of steering wheel 1.

In the exemplary embodiment, the steering gear ratio includes a linear increase section B where the steering gear ratio linearly increases after a neutral section A where the rotation angle of steering wheel 1 from the center is ±10° to ±25°, an upper limit-maintained section C where the increased steering gear ratio is after the linear increase section B, and a linear decrease section D where the steering gear ratio linearly decreases after the upper limit-maintained section C.

The linear decrease section D extends to a steering gear ratio below the steering gear ratio of the neutral section A, and the exemplary embodiment further includes a lower limit-maintained section E where the smallest steering gear ratio is maintained after the linear decrease section D.

The linear increase section B is preferably a section where the rotation angle of steering wheel 1 is 170° to 190° after the neutral section A and is defined at 180° in the figure, the upper limit-maintained section C is preferably a section where the rotation angle of steering wheel 1 is 260° to 280° after the linear increase section B and defined at 270° in the figure showing the exemplary embodiment, and the linear decrease section D is reduced at the same inclination as the linear increase section B.

For reference, the rotation angle of steering wheel 1 is substantially symmetric left and right from the neutral section A, such that the right is indicated by + and the left is indicated by − in the figure. However, only the neutral section A is indicated by ± and the other is indicated only by + values from the right side.

The steering gear ratio is 48~52 mm/rev in the neutral section A, the increase of the steering gear ratio in the linear increase section B is 10~13 mm/rev, and the steering gear ratio is 62~66 mm/rev in the upper limit-maintained section C.

The steering gear ration in the neutral section A is substantially the same as a general steering gear ratio, which is for ensuring high-speed stability when the vehicle travels at high speed and maintaining the steering gear ratio set in common steering apparatuses in the related art to ensure high-speed stability.

The steering gear ratio in the linear increase section B is set in consideration of direct feel, response, and response linearity, such that the drive can receive improved direct feel and response with the gradual increase of the steering gear ratio at the linear increase section B after the neutral section A, when operating steering wheel 1.

The linear increase section B is set at 180° after the neutral section A in order to ensure response linearity, and when the linear increase section B is set shorter, at 90° after the neutral section A, the response linearity is reduced and the steering feel is deteriorated.

On the other hand, the upper limit-maintained section C is defined to reduce frequency of steering in parking, that is, to reduce the excessive number of turn of steering wheel 1, and in order to rapidly turn the steered wheels by implementing more straight motion of steering rack bar 7 with respect to the turn of steering wheel 1, with the maximum steering gear ratio maintained.

The linear decrease section D after the upper limit-maintained section C reduces steering force required to turn steering wheel 1 in parking and provide the driver with convenience by reducing the steering gear ratio at the same level as or below the neutral level.

Steering rack bar 7 equipped with rack 5 having the structure described above can be used for common rack & pinion types of steering apparatuses and can also be used for the MDPS connected with an electric motor providing sub-steering force for steering pinion 3 shown in FIG. 1, in accordance with the operation of steering wheel 1.

For convenience in explanation and accurate definition in the appended claims, the terms "left" and "right" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A steering apparatus for a vehicle, comprising:
a steering pinion rotated by operation of a steering wheel; and
a steering rack bar having a rack engaged with the steering pinion to move straight in a longitudinal direction thereof,
wherein a tooth gap in a gear of the rack changes such that a steering gear ratio corresponding to a linear displacement of the steering rack bar according to rotation of the steering pinion increases and then decreases in both sections from a center of the rack to both ends thereof.

2. The steering apparatus for the vehicle as defined in claim 1, wherein the steering gear ratio includes:
a linear increase section where the steering gear ratio linearly increases after a neutral section;

an upper limit-maintained section where the increased steering gear ratio is maintained after the linear increase section; and a linear decrease section where the steering gear ratio linearly decreases after the upper limit-maintained section.

3. The steering apparatus for the vehicle as defined in claim 2, wherein in the linear increase section, a rotation angle of the steering wheel from a center of the steering wheel in a neutral position is −10° to +25°.

4. The steering apparatus for the vehicle as defined in claim 2, wherein the linear decrease section extends to a steering gear ratio below the steering gear ratio of the neutral section, and the steering gear ratio further includes a lower limit-maintained section where a smallest steering gear ratio is maintained after the linear decrease section.

5. The steering apparatus for the vehicle as defined in claim 4, wherein the linear increase section is a section where a rotation angle of the steering wheel is 170° to 190° from a center of the steering wheel in a neutral position, and the upper limit-maintained section is a section where a rotation angle of the steering wheel is 260° to 280° from the center of the steering wheel in the neutral position.

6. The steering apparatus for the vehicle as defined in claim 5, wherein the linear decrease section is reduced in the same inclination as the linear increase section.

7. The steering apparatus for the vehicle as defined in claim 5, wherein the steering gear ratio is 48 to 52 mm/rev in the neutral section, the increase of the steering gear ratio in the linear increase section is 10 to 13 mm/rev, and the steering gear ratio in the upper limit-maintained section is 62 to 66 mm/rev.

8. The steering apparatus for the vehicle as defined in claim 1, wherein an electric motor providing sub-steering force in accordance with operation of the steering wheel is connected to the steering pinion.

* * * * *